United States Patent
Nair

(10) Patent No.: US 10,958,464 B2
(45) Date of Patent: Mar. 23, 2021

(54) DISTRIBUTED RULES ENGINE

(71) Applicant: Flex Ltd., Singapore (SG)

(72) Inventor: Anoop Krishnan Nair, Allen, TX (US)

(73) Assignee: Flex Ltd., Singapore (SG)

( * ) Notice: Subject to any disclaimer, the term of this patent is extended or adjusted under 35 U.S.C. 154(b) by 0 days.

(21) Appl. No.: 16/688,674

(22) Filed: Nov. 19, 2019

(65) Prior Publication Data

US 2020/0162276 A1    May 21, 2020

Related U.S. Application Data

(63) Continuation of application No. 16/029,041, filed on Jul. 6, 2018, now abandoned.

(60) Provisional application No. 62/659,127, filed on Apr. 17, 2018.

(51) Int. Cl.
   *H04L 12/24*    (2006.01)
   *H04L 12/28*    (2006.01)
   *H04L 12/66*    (2006.01)

(52) U.S. Cl.
   CPC .......... *H04L 12/2803* (2013.01); *H04L 12/66* (2013.01); *H04L 41/12* (2013.01)

(58) Field of Classification Search
   CPC ..... H04L 41/02; H04L 67/10; H04L 41/0803; H04L 41/0213; H04L 67/125; H04L 29/08567; H04L 41/12; H04W 4/50; H04W 72/044; H04W 36/0005; H04W 84/18; H04W 4/029; H04W 4/203; H04W 12/02; H04W 4/70; H04W 88/16; H04W 4/08
   See application file for complete search history.

(56) References Cited

U.S. PATENT DOCUMENTS

| | | | | |
|---|---|---|---|---|
| 2011/0213871 | A1* | 9/2011 | DiGirolamo | H04L 67/12 709/223 |
| 2014/0241354 | A1* | 8/2014 | Shuman | H04L 12/281 370/390 |
| 2015/0236889 | A1* | 8/2015 | Postal | H04L 41/12 709/223 |
| 2015/0373481 | A1* | 12/2015 | Eom | H04W 76/11 370/329 |
| 2016/0128043 | A1* | 5/2016 | Shuman | H04W 72/044 370/331 |
| 2018/0246768 | A1* | 8/2018 | Palermo | H04L 67/12 |
| 2019/0319815 | A1 | 10/2019 | Nair | |

OTHER PUBLICATIONS

Official Action for U.S. Appl. No. 16/029,041, dated Aug. 19, 2019 16 pages.

* cited by examiner

*Primary Examiner* — Jung Liu
(74) *Attorney, Agent, or Firm* — Sheridan Ross P.C.

(57) ABSTRACT

A plurality of devices of an enterprise are identified. For example, lights and door sensors are identified. The plurality of devices of the enterprise uses a plurality of gateways in a hierarchy of gateways to control the plurality of devices of the enterprise. A first rule for at least two of the plurality devices of the enterprise is received. For example, the first rule may be to turn on a light when door is opened. In response to receiving the first rule, a first lowest level gateway of the plurality of gateways in the hierarchy of gateways is determined for applying the first rule for the at least two of the plurality of devices of the enterprise. The first rule for the at least two of the plurality devices of the enterprise is sent to the first lowest level gateway.

20 Claims, 4 Drawing Sheets ically in separate devices. For example, the edge gateway
DISTRIBUTED RULES ENGINE

CROSS REFERENCE TO RELATED APPLICATIONS

The present application is a continuation of and claims priority to U.S. patent application Ser. No. 16/029,041, filed on Jul. 6, 2018, entitled "DISTRIBUTED RULES ENGINE," which claims the benefits of and priority, under 35 U.S.C. § 119(e), to U.S. Provisional Application Ser. No. 62/659,127, filed on Apr. 17, 2018, entitled "DISTRIBUTED RULES ENGINE IN IOT GATEWAYS." The entire disclosure of the applications listed above is hereby incorporated by reference, in its entirety, for all that it teaches and for all purposes.

FIELD

The present disclosure is generally directed to distributed computer applications, in particular, toward distributed computer applications for managing devices.

BACKGROUND

The smart home market continues to grow with a variety of different devices and gadgets being sold to make the home "smarter." These devices either connect directly to a home gateway (e.g., using Wi-Fi or Ethernet) or use another protocol gateway. Smart home ecosystems like Wink™ and Smartthings™ allow devices to share a common gateway. However, many of these device makers are attempting to control the end-to-end ecosystem by providing their own gateways and cloud services. This movement has led to a proliferation of multiple gateways that control devices in the smart home.

Smart home devices allow various rules to be configured to enable notifications on critical events or even enabling machine-to-machine communications with other devices. For example, a door sensor, upon detecting an open door turns on a light. There are several ways in which rules engines are currently implemented. For example, the rules engine may be hosted in a cloud, hosted in the device, or a combination of both where the cloud rules are cached locally.

The current module of having multiple gateways supporting different protocols and ecosystems is inefficient and incompatible. With the current Internet of Things (IoT) architectures where the rules either reside in the cloud or at the main edge gateway results in users experiencing higher latencies and also results a single point of failure in the edge gateway or cloud.

DETAILED DESCRIPTION

Figure 1:
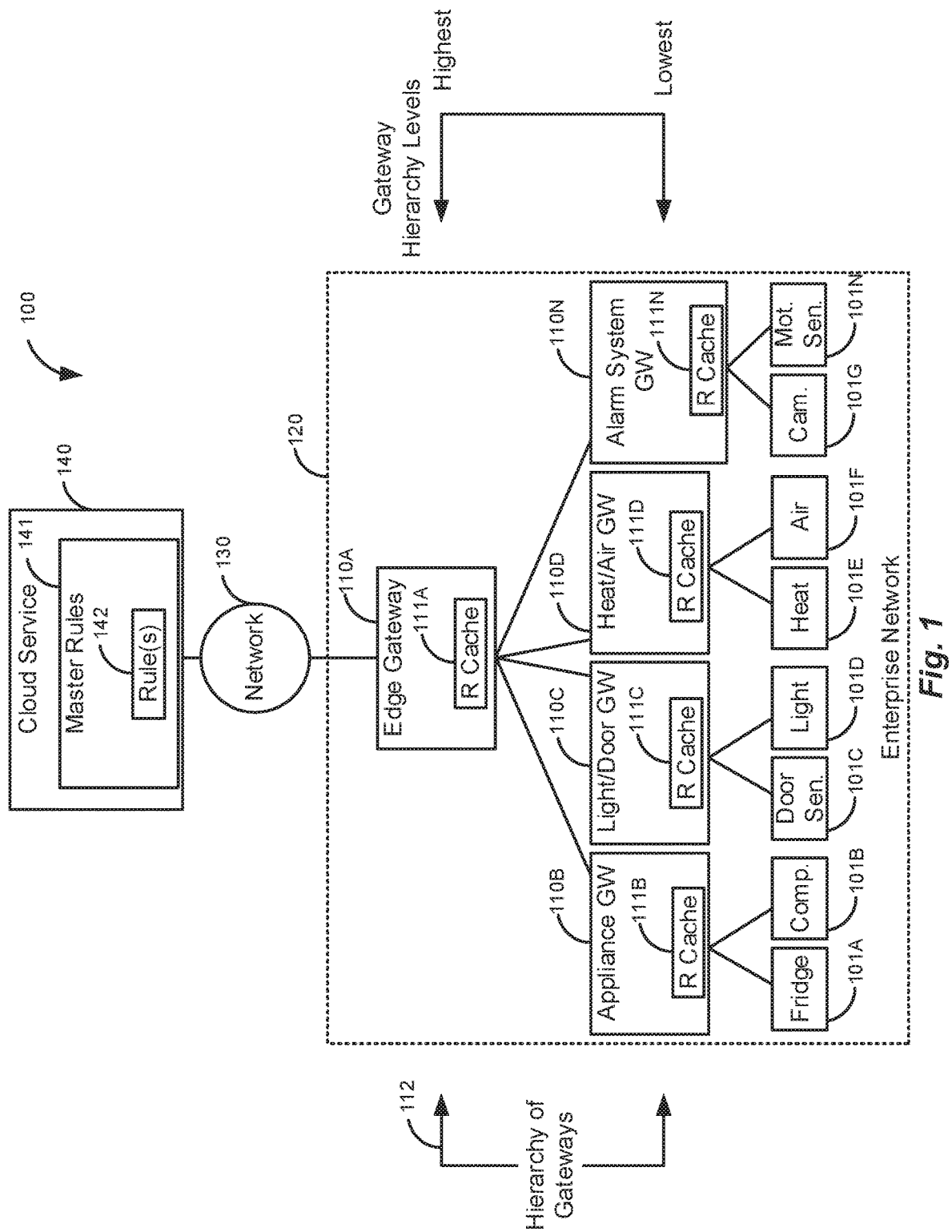
FIG. 1 is a block diagram of a first illustrative system of a distributed rules engine.

FIG. 1 is a block diagram of a first illustrative system 100 of a distributed rules engine. The first illustrative system 100 comprises devices 101A-101N, Gateways 110A-110N, an enterprise network 120, a network 130, and a cloud service 140.

The devices 101A-101N can be or may include any type of device 101, such as a fridge (101A), a computer (101B), a door sensor (101C), a light (101D), a heater (101E), an air conditioner (101F), a camera (101G), a motion sensor 101N, a window switch, an alarm, a siren, a printer, a door lock, a door lock, a scanner, a personal computer, a washer, a dryer, an oven, a wireless device, a smartphone, an audio detector, and/or the like.

The gateways 110A-110N can be or may include any hardware coupled with software that can manage and control the devices 101A-101N. The gateways 110A-110N are typically in separate devices. For example, the edge gateway 110A, the appliance gateway 110B, the light/door gateway 110C, the heat/air gateway 110D, and the alarm system gateway 110N can be separate computing devices connected to a home network (e.g., enterprise network 120).

The gateways 110A-110N are an illustrative example of some of the gateways 110 that may be used. Other embodiments may comprise additional gateways 110 (e.g. a medical gateway 110 that monitors medical devices 101), completely different gateways 110, and/or a subset of the gateways 110A-110N. One of skill in the art could envision various combinations of gateways 110 that may be used based on the types of devices 101 that are supported.

The gateways 110A-110N may be from different vendors that use different protocols. In this case, the edge gateway 110A may support the different protocols that the gateways 110B-110N support. The edge gateway 110 may use different Application Programming Interfaces (APIs) that are provided by the different vendors of the gateways 110B-110N.

The edge gateway 110A is shown in FIG. 1 in the enterprise network 120. However, in other embodiments, the edge gateway 110A may be located in the network 130 or in the cloud service 140. The gateways 110B-110N may be located in a single building (e.g., a home or business) or distributed between multiple buildings/locations.

In FIG. 1, the gateways 110A-110N are arranged as a hierarchy of gateways 112. FIG. 1 shows a two level hierarchy of gateways 112 where the edge gateway 110A is at the highest level in the hierarchy of gateways 112 and the gateways 110B-110N are at the lowest level of the hierarchy of gateways 112. Although not shown in FIG. 1, the hierarchy of gateways 112 may include one or more additional levels. For example, a new gateway 110 that supports appliances and lighting/doors may be between the edge gateway 110A and the appliance gateway 110B/light/door gateway 110C. In this exemplary embodiment, there is a three level hierarchy (appliance/light/door gateways 110B-110C→new gateway 110→edge gateway 110A) and a two level hierarchy (Heat/Air gateway 110D/Alarm system gateway 110N→edge gateway 110A) in the hierarchy of gateways 112 (i.e. a mixed level hierarchy). In an embodiment, there may be three or more layers (mixed and/or non-mixed) levels in the hierarchy of gateways 112.

The gateways 110A-110N also include respective rule caches 111A-111N. The rule caches 111A-111N store rule(s) 142 for the respective gateway 110A-110N. The rule(s) 142 in the rule caches 111A-111N can dynamically change based user administration and/or other types of configuration. Depending upon the types of rules 142, an individual gateway 110 may or may not have any rules 142 stored in the rule cache 111 (see the discussion of FIGS. 2-3).

The rule(s) 142 are associated with the devices 101A-101N. For example, a rule 142 may be to turn on a light 101D when a door sensor 101C detects that a door is opened, to turn on a heating system 101E when a door sensor 101C detects that a door is opened, to turn on a light 101D when a motion sensor 101N detects movement, to turn on a camera 101G when the motion sensor 101N detects movement, to enable a display on a fridge 101A when the motion sensor 101N detects a person in a room, and/or the like.

The enterprise network 120 can be or may include any type of network that distinguishes an enterprise from other enterprises, such as a home network, a corporate network, a business network, a building network, a local area network, and/or the like. An enterprise may be a home, a building, a corporation, a business, a designated area, and/or the like. The enterprise network 120 may use a variety of protocols, such as WiFi, Ethernet, Wireless Access Protocol (WAP), cellular protocols, Internet Protocol (IP), Zigbee™, X10, Z Wave, KNX (e.g., ISO/ICE 14543), Internet Protocol (IP), and/or the like. The enterprise network 120 may be protected by a firewall (not shown) that isolates the enterprise network 120 from the network 130.

The network 130 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 130 can use a variety of electronic protocols, such as Ethernet, Internet Protocol (IP), Session Initiation Protocol (SIP), Web Real-Time Protocol (WebRTC), Integrated Services Digital Network (ISDN), and the like. Thus, the network 130 is an electronic communication network configured to carry messages via packets and/or circuit switched communications.

The cloud service 140 can be or may include any hardware coupled with software that can manage and control the gateways 110A-110N and the devices 101A-101N. The cloud service 140 may be owned by a service provider that provides services to manage an enterprise. In one embodiment, the cloud service 140 may support multiple enterprise networks 120.

The cloud service 140 further comprise master rules 141 and rule(s) 142. The master rules 141 comprises all the rules 142 that are stored in the rule caches 111A-111N. Where the cloud service 140 supports multiple enterprise networks 120, there may be multiple master rules 141 for each enterprise network 120.

Figure 2:
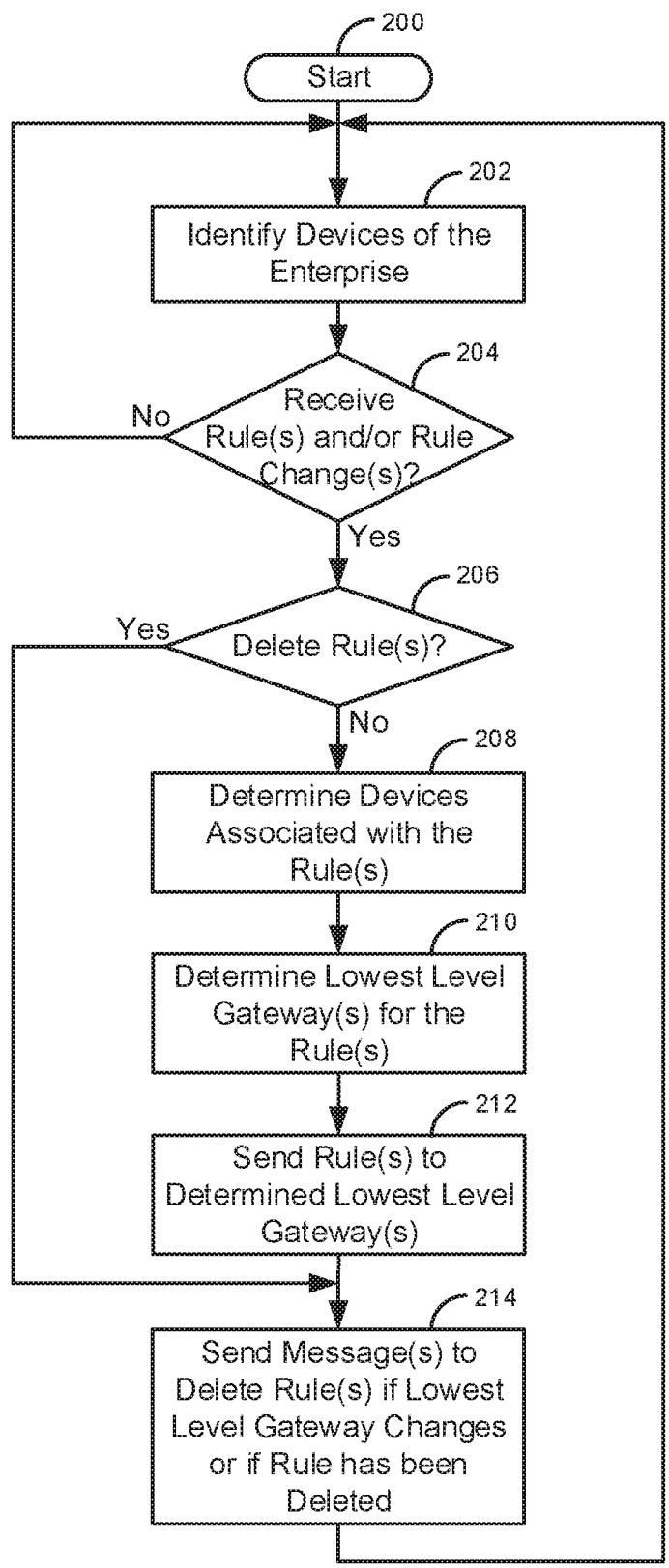
FIG. 2 is a flow diagram of a process for a distributed rules engine.
Figure 3:
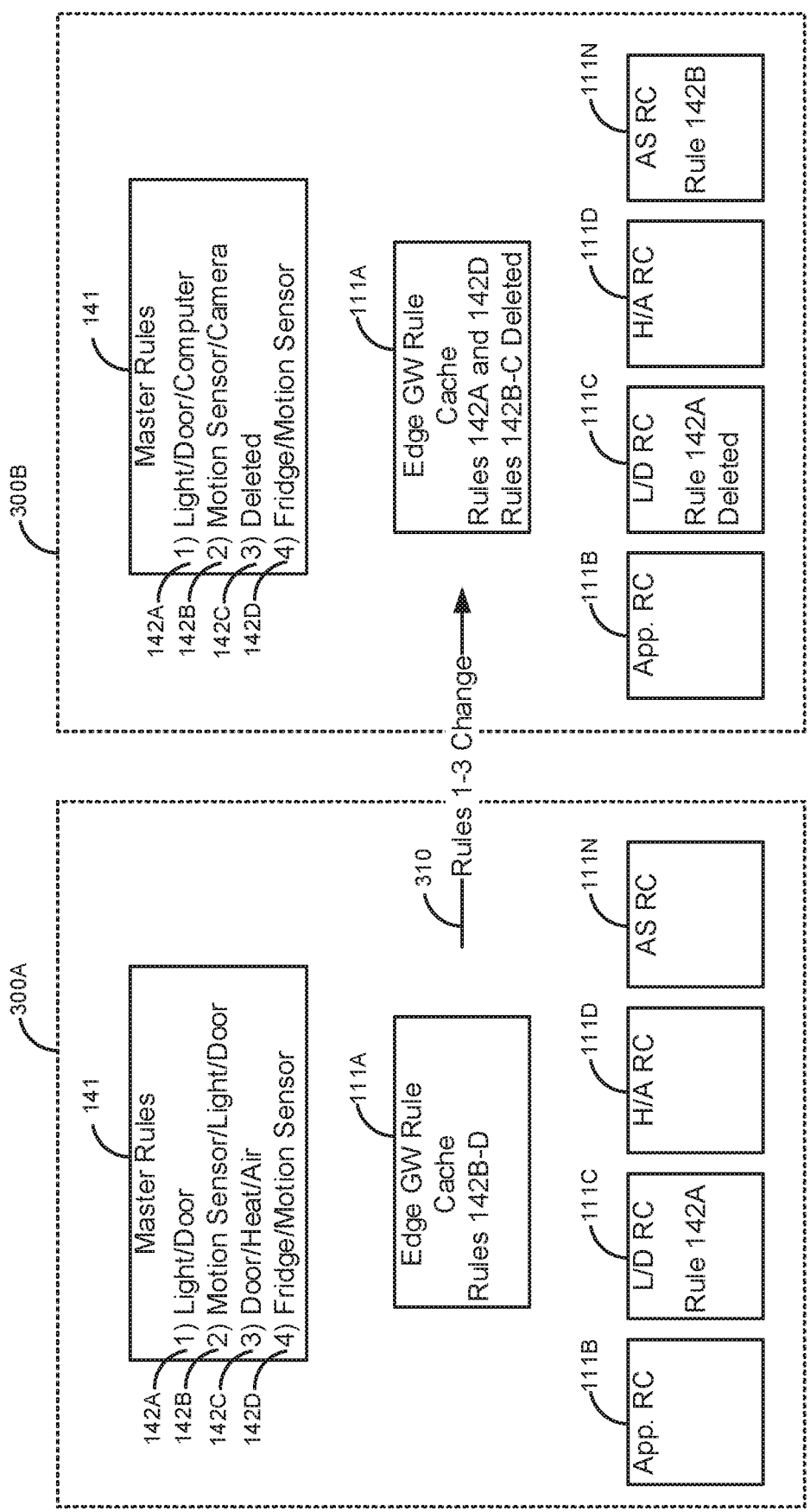
FIG. 3 is a diagram that illustrates how changes in rules are distributed in a hierarchy of gateways.

FIG. 2 is a flow diagram of a process for a distributed rules engine. Illustratively, the devices 101A-101N, the gateways 110A-110N, the rule caches 111A-111N, the enterprise network 120, the network 130, and the cloud service 140 are stored-program-controlled entities, such as a computer or microprocessor, which performs the method of FIGS. 2-3 and the processes described herein by executing program instructions stored in a computer readable storage medium, such as a memory (i.e., a computer memory, a hard disk, and/or the like). Although the methods described in FIGS. 2-3 are shown in a specific order, one of skill in the art would recognize that the steps in FIGS. 2-3 may be implemented in different orders and/or be implemented in a multi-threaded environment. Moreover, various steps may be omitted or added based on implementation.

The process starts in step 200. The cloud service 140 identifies devices 101A-101N of the enterprise in step 202. The cloud service 140 may identify the devices 101A-101N in various ways. For example, the cloud service 140 may query the gateways 110B-110N to identify the devices 101A-101N. Alternatively, the gateways 110B-110N may send information about the devices 101A-101N (e.g., device type, location, device attributes, etc.) to the cloud service 140 as the devices 101A-101N register with their respective gateways 110B-110N.

In one embodiment, a hierarchy of gateways 112 are used. In this embodiment, the gateways 110B-110N can report the devices 101A-101N to the edge gateway 110A. The edge gateway 110A can then be queried or notify the cloud service 140 of the identified devices 101 in step 202.

The cloud service 140 determines, in step 204, if one or more rule(s) 142 have been received (e.g., one or more new rules 142) and/or if one or more of the rule(s) 142 have changed. For example, a user at the computer 101B may access the cloud service 140 and setup a new rule 142 to turn on a specific light 101D in a house when the door sensor 101C detects that the user has opened the front door of a house. Alternatively, the user may change an existing rule 142. For example, the user may change the rule 142 where the specific light 101D is turned on when the door sensor 101C detects that the user has opened the front door to also include turning on the computer 101B. In addition, a change to a rule 142 may be that an existing rule 142 has been deleted (e.g., by the user).

If one or more rules 142 have not been received and/or changed in step 204, the process goes back to step 202. Otherwise, if the one or more rules 142 have been received and/or changed in step 204, the cloud service 140 determines if the change is to only delete a rule(s) 142 in step 206. If the change is to only delete rule(s) 142 in step 206, the process goes to step 214. Otherwise, if there are received rule(s) 142 and/or the change is more than to just delete the rule(s) 142 the cloud service 140 determines, in step 208, the devices 101 that are associated with the one or more received and/or changed rules 142. In step 206, if there are both deleted rule(s) 142 and, new and/or changed rules 142, both the Yes path and No paths of step 206 may be implemented.

The cloud service 140 determines, in step 210, the lowest level gateway 110 for the one or more received and/or changed rules 142. For example, where the received rule 142 was to turn on specific light 101D when the door sensor 101C detects that the front door of a home has been opened, the cloud service 140 determines that the lowest level gateway 110 is the light/door gateway 110C because the light/door gateway 110C is the lowest level gateway 110 that supports all of the devices 101C/101D associated with the received rule 142. If the above rule 142 is changed to turn on the computer 101B/light 101D when the door sensor 101C detects that the front door has been opened, the determined lowest level gateway 110 in step 210 is the edge gateway 110A because the edge gateway 110A is the lowest level gateway 110 that supports all of the devices 101B/101C/101D associated with the changed rule 142.

The received/changed one or more rules 142 are then sent by the cloud service 140 to the determined lowest level gateway(s) 110 in step 212. If the determined lowest level gateway(s) 110 has changed and/or the rule(s) 142 have been deleted, the cloud service 140 sends, in step 214, a message to delete the rule 142 in the previous lowest level gateway(s) 110 where the rule(s) resided before the deletion/change. The process then goes to step 202 where the process can repeat for additional rules 142/changed rules 142.

To illustrate steps 212/214, consider the following examples. If the lowest level gateway 110 for the rule 142 was previously in the light/door gateway 110C and the change in the rule 142 resulted in the lowest level gateway 110 now being the edge gateway 110A, the changed rule 142 is sent to the edge gateway 110A, in step 212, and the message to delete the rule 142 is sent to the light/door gateway 110C. If the change was to delete a rule 142 that was previously in the appliance gateway 110B, the sent message of step 214 would be to delete the rule 142 in the appliance gateway 110B.

FIG. 3 is a diagram that illustrates how changes in rules 142 are distributed in a hierarchy of gateways 112. FIG. 3 shows how changes to the rules 142A-142D in the master rules 141 affect what rules 142 are stored in the rule caches 111A-111N.

FIG. 3 comprises rule set 300A and rule set 300B. The rule set 300A shows the rules 142A-142D that are stored in the master rules 141 and then sent out to the rule caches 111A and 111C.

For rule set 300A, the first rule 142A uses the light 101D and a door sensor 101C. The first rule 142A is to turn on the light 101D when the door sensor 101C detects that the door is opened.

For rule set 300A, the second rule 142B uses the motion sensor 101N, the light 101D, and the door sensor 101C. The second rule 142B uses the motion sensor 101N to detect motion outside of a house and turn on an outside light 101D and automatically lock the doors (a door lock device 101 not shown) based on the detected motion.

For rule set 300A, the third rule 142C uses the door sensor 101C, the heater 101E, and the air conditioner 101F. The third rule 142C turns on new temperature setting for the heater 101E/air conditioner 101F when the door sensor 101C detects that the door has been opened.

For rule set 300A, the fourth rule 142D uses the fridge 101A and the motion sensor 101N. The fourth rule 142D turns on a display in the fridge 101A when the motion sensor 101N detects motion in a room where the fridge 101A is located.

For first rule 142A in rule set 300A, the cloud service 140 determines that the lowest level gateway 110 is the light/door gateway 110C because the devices 101 for the first rule 142A are a light 101D and a door sensor 101C, which are managed by the light/door gateway 110C. The first rule 142A in the rule set 300A is stored in the rule cache 111C.

For the second rule 142B in the rule set 300A, the cloud service 140 determines that the lowest level gateway 110 is the edge gateway 110A because the devices 101 for the second rule 142B are the motion sensor 101N, the light 101D, and the door sensor 101C, which have to be managed by the edge gateway 110A. The second rule 142B in the rule set 300A is stored in the rule cache 111A for the edge gateway 110A.

For the third rule 142C in the rule set 300A, the cloud service 140 determines that the lowest level gateway 110 is the edge gateway 110A because the devices 101 for the third rule 142C are the door sensor 101C, the heater 101E, and the air conditioner 101F, which have to be managed by the edge gateway 110A. The third rule 142C in the rule set 300A is stored in the rule cache 111A for the edge gateway 110A.

For the fourth rule 142D in the rule set 300A, the cloud service 140 determines that the lowest level gateway 110 is the edge gateway 110A because the devices 101 for the fourth rule 142D are the fridge 101A and the motion sensor 101N, which have to be managed by the edge gateway 110A. The fourth rule 142D in the rule set 300A is stored in the rule cache 111A for the edge gateway 110A.

A user decides to change the rules 142A-142C in step 310 (identified in step 204). For example, a user at the computer 101B accesses the cloud service 140 and changes the rules 142A-142C in the mater rules 141 to produce the rule set 300B. In rule set 300B, the rule 142A is changed to also turn on the computer 101B when the door sensor 101C determines that the door has been opened. The change results in the lowest level gateway 110 changing from the light/door gateway 110C to the edge gateway 110A because the computer 101B cannot be controlled by the light/door gateway 110C. As a result, the changed rule 142A is sent, in step 212, to the edge gateway 110A and stored in the rule cache 111A. The rule 142A that was previously stored in the rule cache 111C is deleted in step 214.

In rule set 300B, the rule 142B is changed from using the motion sensor 101N to turn on the light 101D and lock a door to turning on a camera 101G when the motion sensor 101N detects motion. The change results in the lowest level gateway 110 changing from the edge gateway 110A to the alarm system gateway 110N because the alarm system gateway 110N supports both the camera 101G and motion sensor 101N. As a result, the changed rule 142B is sent, in step 212, to the alarm system gateway 110N and stored in the rule cache 111N. The rule 142B that was previously stored in the rule cache 111A is deleted in step 214.

In the rule set 300B, the rule 142C has been deleted by the user. This results in the rule 142C being deleted in step 214 from the rule cache 111A in the edge gateway 110A. The rule 142D was not changed, therefore, there is no change made based on rule 142D.

Figure 4:
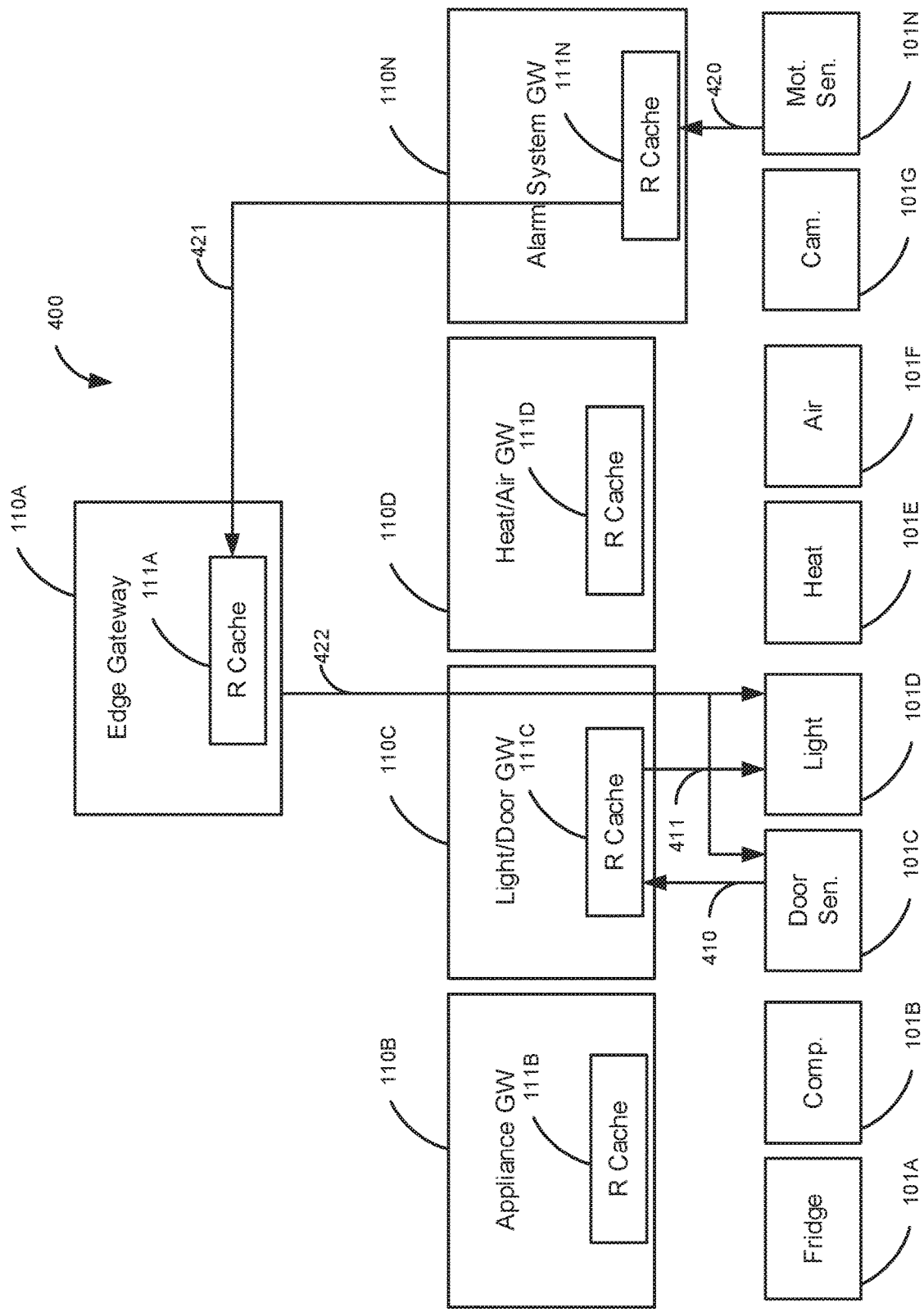
FIG. 4 is a block diagram that illustrates how rules are executed in a distributed hierarchy of gateways.

FIG. 4 is a block diagram 400 that illustrates how rules 142 are executed in a distributed hierarchy of gateways 112. FIG. 4 shows how the rules 142A and 142B of FIG. 3 are executed using the rule set 300A.

The first rule 142A of the rule set 300A is to turn on the light 101D when the door sensor 101C detects that the door is opened. When the door sensor 101C detects the door being opened, the door sensor 101C sends in step 410, a message to the light/door gateway 110C that the door is being opened. The light/door gateway 110C determines that the rule 142A is in the rule cache 111C. Based on the rule 142A in the rule cache 111C, the light/door gateway 110C sends a message, in step 411 to the light 101D to turn on.

The second rule 142B of the rule set 300A uses the motion sensor 101N to detect motion outside of a house and turn on an outside light 101D and automatically lock the doors based on the detected motion. The motion sensor 101N detects movement (i.e., an unknown person) and sends a message to the alarm system gateway 110N in step 420. The alarm system gateway 110N determines that there are not any rules in the rules cache 111N for the motion sensor 101N. The alarm system gateway 110N sends the message of step 420 to the edge gateway 110A in step 421. The edge gateway 110A finds the rule 142B for the motion sensor 101N in the rule cache 111A. The edge gateway 110A sends a message, via the light/door gateway 110C to the door sensor 101C/light 101D to lock the doors and turn on the light 101D.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor 102 or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors 102), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor 102 or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor 102, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a system comprising: a microprocessor; a computer readable medium, coupled with the microprocessor and comprising microprocessor readable and executable instructions that program the microprocessor to: identify a plurality of devices of an enterprise, wherein the plurality of devices of the enterprise use a plurality of gateways in a hierarchy of gateways to control the plurality of devices of the enterprise; receive a first rule for at least two of the plurality devices of the enterprise; in response to receiving the first rule for the at least two of the plurality of devices of the enterprise, determine a first lowest level gateway of the plurality of gateways in the hierarchy of gateways for applying the first rule for the at least two of the plurality of devices of the enterprise; and send the rule for the at least two of the plurality devices of the enterprise to the first lowest level gateway.

Aspects of the above system include wherein the plurality of gateways in the hierarchy of gateways are separate devices from different vendors that use different protocols.

Aspects of the above system include wherein the microprocessor readable and executable instructions further program the microprocessor to receive a second rule that is for at least two different devices of the plurality of devices of the enterprise and wherein the second rule is sent to a second lowest level gateway.

Aspects of the above system include wherein the first lowest level gateway is at a lowest level in the hierarchy of gateways and wherein the second lowest level gateway is at a highest level in the hierarchy of gateways.

Aspects of the above system include wherein the microprocessor readable and executable instructions further program the microprocessor to: identify that a new device of the plurality of devices of the enterprise has been added to the first rule; in response to identifying that the new device of the plurality of devices of the enterprise has been added to the first rule, determine a second lowest level gateway of the plurality of gateways in the hierarchy of gateways for applying the first rule with the added new device; and send the first rule with the added new device to the second lowest level gateway.

Aspects of the above system include wherein the microprocessor readable and executable instructions further program the microprocessor to send a message to the first lowest level gateway to delete the first rule for the at least two of the plurality devices in the first lowest level gateway.

Aspects of the above system include wherein the second lowest level gateway is at a higher level in the hierarchy gateways than the first lowest level gateway.

Aspects of the above system include wherein the first rule for the at least two of the plurality of devices of the enterprise is for at least three devices of the plurality of devices of the enterprise and wherein the microprocessor readable and executable instructions further program the microprocessor to: identify that a first device of the at least three of the plurality of devices of the enterprise has been removed from the first rule; in response to identifying that the first device of the at least three of the plurality of devices of the enterprise has been removed from the first rule, determine a second lowest level gateway of the plurality of gateways in the hierarchy of gateways for applying the first rule with the removed first device; and send the first rule with the removed device to the second lowest level gateway.

Aspects of the above system include wherein the second lowest level gateway is at a lower level in a hierarchy of gateways than the first lowest level gateway.

Aspects of the above system include wherein the microprocessor readable and executable instructions further program the microprocessor to send a message to the first lowest level gateway to delete the first rule for the at least three devices of the plurality of devices of the enterprise in the first lowest level gateway.

Embodiments include a method comprising: identifying, by a microprocessor, a plurality of devices of an enterprise, wherein the plurality of devices of the enterprise use a plurality of gateways in a hierarchy of gateways to control the plurality of devices of the enterprise; receiving, by the microprocessor, a first rule for at least two of the plurality devices of the enterprise; in response to receiving the first rule for the at least two of the plurality of devices of the enterprise, determining, by the microprocessor, a first lowest level gateway of the plurality of gateways in the hierarchy of gateways for applying the first rule for the at least two of the plurality of devices of the enterprise; and sending, by the microprocessor, the rule for the at least two of the plurality devices of the enterprise to the first lowest level gateway.

Aspects of the above method include wherein the plurality of gateways in the hierarchy of gateways are separate devices from different vendors that use different protocols.

Aspects of the above method further comprising receiving a second rule that is for at least two different devices of the plurality of devices of the enterprise and wherein the second rule is sent to a second lowest level gateway.

Aspects of the above method include wherein the first lowest level gateway is at a lowest level in the hierarchy of gateways and wherein the second lowest level gateway is at a highest level in the hierarchy of gateways.

Aspects of the above method further comprising: identifying that a new device of the plurality of devices of the enterprise has been added to the first rule; in response to identifying that the new device of the plurality of devices of the enterprise has been added to the first rule, determining a second lowest level gateway of the plurality of gateways in the hierarchy of gateways for applying the first rule with the added new device; and sending the first rule with the added new device to the second lowest level gateway.

Aspects of the above method comprise sending a message to the first lowest level gateway to delete the first rule for the at least two of the plurality devices in the first lowest level gateway.

Aspects of the above method include wherein the second lowest level gateway is at a higher level in the hierarchy gateways than the first lowest level gateway.

Aspects of the above method include wherein the first rule for the at least two of the plurality of devices of the enterprise is for at least three devices of the plurality of devices of the enterprise and further comprising: identifying that a first device of the at least three of the plurality of devices of the enterprise has been removed from the first rule; in response to identifying that the first device of the at least three of the plurality of devices of the enterprise has been removed from the first rule, determining a second lowest level gateway of the plurality of gateways in the hierarchy of gateways for applying the first rule with the removed first device; and sending the first rule with the removed device to the second lowest level gateway.

Aspects of the above method include wherein the second lowest level gateway is at a lower level in a hierarchy of gateways than the first lowest level gateway.

Aspects of the above method further comprising sending a message to the first lowest level gateway to delete the first rule for the at least three devices of the plurality of devices of the enterprise in the first lowest level gateway.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "enterprise" as discussed herein an in the claims may include a home, a business, a building, an area, and/or the like.

What is claimed is:

1. A system, comprising:
   a microprocessor;
   a computer readable medium, coupled with the microprocessor and comprising microprocessor readable and executable instructions that program the microprocessor to:
      identify a plurality of devices of an enterprise, wherein the plurality of devices of the enterprise are controlled through a plurality of gateways in a hierarchy of gateways;
      receive a first rule, wherein the first rule controls at least two of the plurality of devices of the enterprise;
      in response to receiving the first rule, determine a first lowest level gateway of the plurality of gateways in the hierarchy of gateways that supports the at least two of the plurality of devices of the enterprise controlled by the first rule; and
      send the first rule to the first lowest level gateway that supports the at least two of the plurality of devices of the enterprise controlled by the first rule.

2. The system of claim 1, wherein the plurality of gateways in the hierarchy of gateways are separate devices from different vendors that use different protocols.

3. The system of claim 1, wherein the microprocessor readable and executable instructions further program the microprocessor to receive a second rule for controlling at least two different devices of the plurality of devices of the enterprise and wherein the second rule is sent to a second lowest level gateway.

4. The system of claim 3, wherein the first lowest level gateway is at a lowest level in the hierarchy of gateways and wherein the second lowest level gateway is at a highest level in the hierarchy of gateways.

5. The system of claim 1, wherein the microprocessor readable and executable instructions further program the microprocessor to:
   identify that a new device of the plurality of devices of the enterprise has been added to the first rule;
   in response to identifying that the new device of the plurality of devices of the enterprise has been added to the first rule, determine a second lowest level gateway of the plurality of gateways in the hierarchy of gateways that supports the new device and the at least two of the plurality of devices of the enterprise controlled by the first rule; and
   send the first rule with the added new device to the second lowest level gateway.

6. The system of claim 5, wherein the microprocessor readable and executable instructions further program the microprocessor to send a message to the first lowest level gateway to delete the first rule for controlling the at least two of the plurality of devices.

7. The system of claim 5, wherein the second lowest level gateway is at a higher level in the hierarchy of gateways than the first lowest level gateway.

8. The system of claim 1, wherein the first rule for controlling the at least two of the plurality of devices of the enterprise is for controlling at least three devices of the plurality of devices of the enterprise and wherein the microprocessor readable and executable instructions further program the microprocessor to:
identify that a first device of the at least three of the plurality of devices of the enterprise has been removed from the first rule;
in response to identifying that the first device of the at least three of the plurality of devices of the enterprise has been removed from the first rule, determine a second lowest level gateway of the plurality of gateways in the hierarchy of gateways for applying the first rule without the removed first device; and
send the first rule without the removed first device to the second lowest level gateway.

9. The system of claim 8, wherein the second lowest level gateway is at a lower level in the hierarchy of gateways than the first lowest level gateway.

10. The system of claim 8, wherein the microprocessor readable and executable instructions further program the microprocessor to send a message to the first lowest level gateway to delete the first rule for controlling the at least three devices of the plurality of devices of the enterprise.

11. A method, comprising:
identifying, by a microprocessor, a plurality of devices of an enterprise, wherein the plurality of devices of the enterprise are controlled through a plurality of gateways in a hierarchy of gateways;
receiving, by the microprocessor, a first rule for controlling at least two of the plurality of devices of the enterprise;
in response to receiving the first rule, determining, by the microprocessor, a first lowest level gateway of the plurality of gateways in the hierarchy of gateways that supports the at least two of the plurality of devices of the enterprise controlled by the first rule; and
sending, by the microprocessor, the first rule to the first lowest level gateway.

12. The method of claim 11, wherein the plurality of gateways in the hierarchy of gateways are separate devices from different vendors that use different protocols.

13. The method of claim 11, further comprising, receiving a second rule that is for controlling at least two different devices of the plurality of devices of the enterprise and wherein the second rule is sent to a second lowest level gateway.

14. The method of claim 13, wherein the first lowest level gateway is at a lowest level in the hierarchy of gateways and wherein the second lowest level gateway is at a highest level in the hierarchy of gateways.

15. The method of claim 11, further comprising:
identifying that a new device of the plurality of devices of the enterprise has been added to the first rule;
in response to identifying that the new device of the plurality of devices of the enterprise has been added to the first rule, determining a second lowest level gateway of the plurality of gateways in the hierarchy of gateways that supports the new device and the at least two of the plurality of devices of the enterprise controlled by the first rule; and
sending the first rule with the added new device to the second lowest level gateway.

16. The method of claim 15, further comprising sending a message to the first lowest level gateway to delete the first rule for controlling the at least two of the plurality of devices.

17. The method of claim 15, wherein the second lowest level gateway is at a higher level in the hierarchy of gateways than the first lowest level gateway.

18. The method of claim 11, wherein the first rule for controlling the at least two of the plurality of devices of the enterprise is for controlling at least three devices of the plurality of devices of the enterprise and further comprising:
identifying that a first device of the at least three of the plurality of devices of the enterprise has been removed from the first rule;
in response to identifying that the first device of the at least three of the plurality of devices of the enterprise has been removed from the first rule, determining a second lowest level gateway of the plurality of gateways in the hierarchy of gateways that supports the at least three of the plurality of devices without the removed first device controlled by the first rule; and
sending the first rule without the removed first device to the second lowest level gateway.

19. The method of claim 18, wherein the second lowest level gateway is at a lower level in the hierarchy of gateways than the first lowest level gateway.

20. The method of claim 18, further comprising sending a message to the first lowest level gateway to delete the first rule for controlling the at least three devices of the plurality of devices of the enterprise.

* * * * *